United States Patent Office 3,420,329
Patented Jan. 7, 1969

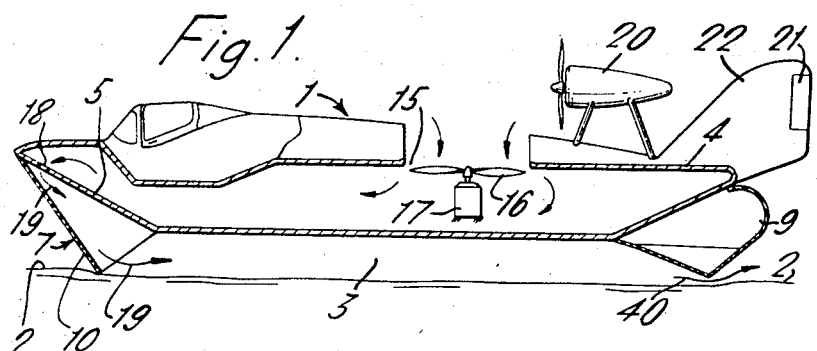

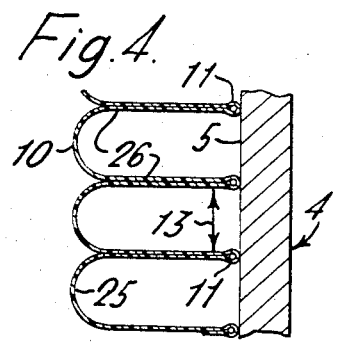
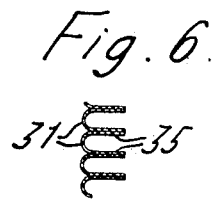
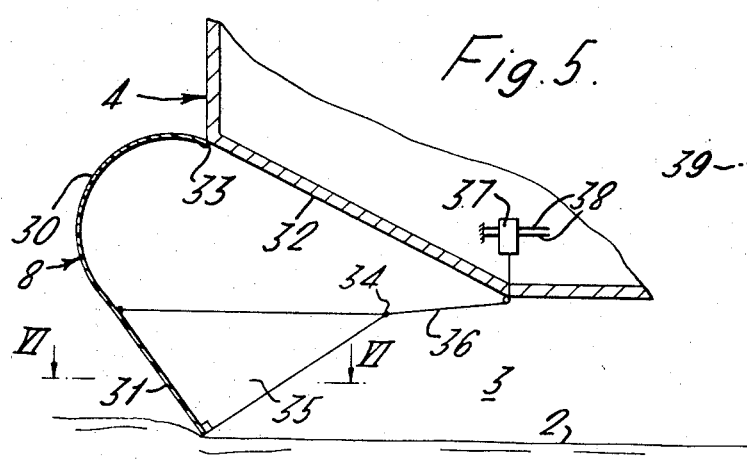
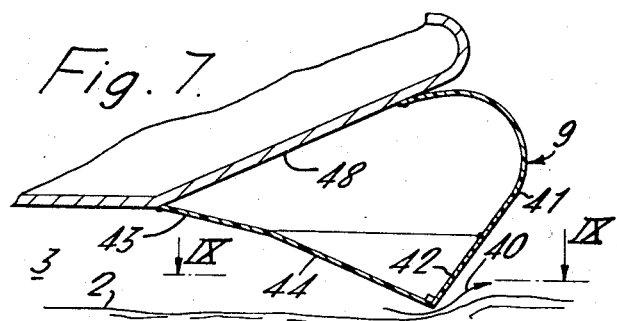

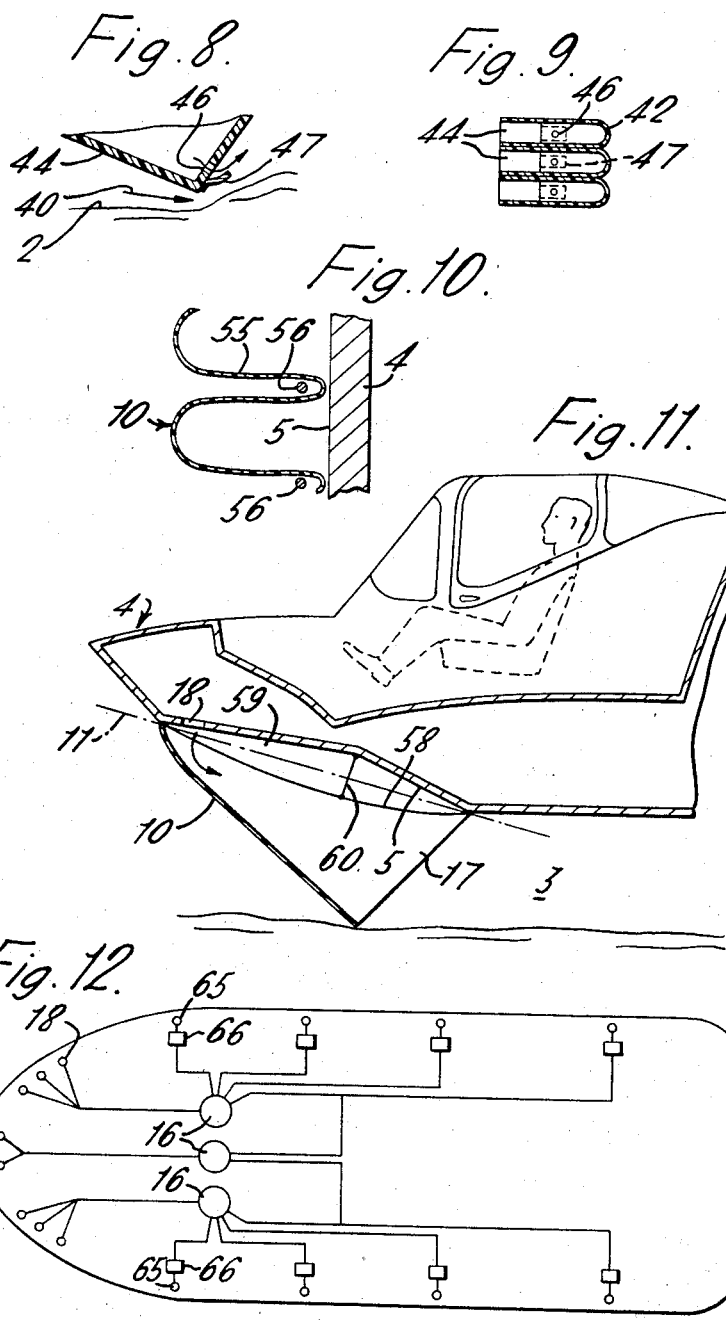

3,420,329
GAS-CUSHION VEHICLES
Robert Granville Moore, Southampton, England, assignor to Hovercraft Development Limited, London, England, a British company
Filed June 8, 1966, Ser. No. 556,239
Claims priority, application Great Britain, June 9, 1965, 24,355/65
U.S. Cl. 180—118          8 Claims
Int. Cl. B60v 1/04; B60v 3/00; B60v 1/16

ABSTRACT OF THE DISCLOSURE

A gas-cushion vehicle having a prow portion with an upwardly sloping under surface is provided with a flexible cushion-containing wall comprising a plurality of individually deflectable loops of flexible sheet material depending from the sloping under surface and attached thereto along lines extending substantially in a fore and aft direction, each of the loops having a deep fold at its lower end reaching below the lowest part of the hull to a distance slightly less than the desired depth of the gas cushion, and tapering upwardly towards a minimum depth of fold at its upper end. Pressurised gas is delivered to the interior of the loops for discharge in a generally downward direction therebelow to at least assist in the formation and maintenance of the gas cushion.

---

This invention relates to gas-cushion vehicles, that is to say, to vehicles for travelling over a surface and which, in operation, are supported at least in part above said surface by a cushion of pressurised gas formed and contained beneath the vehicle body.

The invention particularly relates to gas-cushion vehicles wherein their supporting cushions are contained, for at least part of their peripheries, by flexible walls projecting downwardly from the vehicle bodies. One type of flexible wall in current use is made of flexible sheet material inflatable to conform to a desired shape.

Copending, commonly owned application Ser. No. 528,238 discloses a gas-cushion vehicle provided with a cushion-containing wall comprising upper and lower wall members of flexible sheet material inflatable to conform to desired shapes. The upper wall member of this wall has a cross-section, viewed in a direction parallel to the cushion periphery, which extends initially outwardly then downwardly, then inwardly, relative to the cushion in a smooth curve.

It has been discovered that although the vehicle disclosed by said copending application is likely to provide a satisfactory performance under a wide range of conditions, when operating over a rough sea the prow portion of the cushion-containing wall of the vehicle may collapse locally when brought into contact with a large wave. This collapse introduces a large drag load which becomes cumulative as more and more of the wall is pulled down towards and in contact with the surface of the water.

According to the present invention, a gas-cushion vehicle is provided with a hull structure having a prow portion with an under surface which slopes upwardly from the bottom region of said hull structure and a flexible cushion-containing wall carried by said prow portion, said wall comprising a plurality of loops of flexible sheet material depending from said sloping under surface and attached thereto along lines extending substantially in the fore and aft direction thereof, said loops each having a deep fold at its lower end reaching below the lowest part of said hull structure to a distance slightly less than the desired depth of the air cushion beneath said hull, the loops tapering upwardly towards a minimum depth of fold at the upper ends thereof, and means for delivering pressurised gas to the interior of at least the foremost of the loops for discharge in a generally downward direction therebelow to at least assist in the formation and maintenance of said gas cushion.

In its present application the word "deep" in respect of a loop fold means that the depth of fold is at least equal to the width of the loop.

An embodiment of the invention will now be described by way of example with reference to the accompanying drawings wherein:

FIGURE 1 is a vertial, longitudinal section of a gas-cushion vehicle taken on the lines I—I of FIGURE 2, FIGURE 2 is an inverted plan view of the gas-cushion vehicle of FIGURE 1, FIGURE 3 is a detail, to an enlarged scale, of part of FIGURE 1, FIGURE 4 is a section on the lines IV—IV of FIGURE 3, FIGURE 5 is a fragmentary section, to an enlarged scale, taken on the lines V—V of FIGURE 2, FIGURE 6 is a fragmentary section, taken on the lines VI—VI of FIGURE 5, FIGURE 7 is a further detail, to an enlarged scale, of part of FIGURE 2, FIGURE 8 is a detail, to an enlarged scale, of part of FIGURE 7, FIGURE 9 is a fragmentary section, taken on the lines IX—IX of FIGURE 7, FIGURE 10 is a view similar to that of FIGURE 4 and illustrates a modification thereof, FIGURE 11 is a fragmental side view similar to part of FIGURE 1 and illustrates a modification thereof, and FIGURE 12 is a diagrammatic inverted plan view illustrating further modifications.

With reference to FIGURES 1 to 4, a gas-cushion vehicle 1 of the so-called "plenum-chamber" type is shown travelling over a water surface 2 and is supported above the surface 2 by a cushion 3 of pressurised air formed and contained beneath the vehicle hull structure 4. The hull 4 has a prow portion with a substantially planar sloping under surface 5 which slopes upwardly from the bottom region of the hull 4.

The cushion 3 is contained for most of its lateral boundary by an inflatable, flexible cushion-containing wall 6 which extends around and is attached to the periphery of the hull 4. The wall 6 comprises prow, side and stern wall parts 7, 8 and 9 respectively. The prow wall part 7 comprises a plurality of loops 10 of thin flexible sheet material (e.g., 15 oz. per square yard, .020 inch thick rubberised fabric or polyurethane) depending from the prow surface 5 and attached thereto by clamping strips along lines of attachment 11 (indicate by chain-dotted lines in FIGURES 2 and 3) extending in the fore-to-aft direction thereof. As illustrated in FIGURE 3, each loop 10 has a deep fold 12 at its lower end, the fold 12 reaching below the lowest part of the hull 4 to a distance slightly less than the depth of the cushion 3 beneath the hull. The depth of the fold 12 at its lower end is substantially equal to four times the width 13 (FIGURE 4 only) of the loop 10, i.e., the distance between opposite side portions of the loop. The loops 10 taper upwardly towards a minimum depth of fold at their upper ends. Air is drawn into the hull 4 which is hollow and serves as a plenum chamber, through an intake 15 by a fan 16 driven by a variable speed motor 17. Thereafter the air is delivered, under pressure, to the upper interiors of the loops 10 extending over the area A, i.e., the foremost of the loops 10, by way of apertures 18 penetrating the hull 4. The air flows in a generally downwards direction through the loops 10, as indicated by the arrows 19, to maintain the air cushion 3. The vehicle 1 is propelled over the surface 2 by an air-screw propeller unit 20 and is steered thereover by a rudder 21 mounted on a stabilising fin 22.

With particular reference now to FIGURE 4, the loops 10 are similar to the flexible wall members disclosed in copending commonly owned application Ser. No. 566,948. That is to say, they are formed from separate pieces of flexible material each folded to provide a horizontal cross-section of substantially U-like form with a concave portion 25 with the hollow of its concavity facing the cushion 3 and two side or tie portions 26 extending inwardly from the concavity also towards the cushion 3. When the loops 10 are inflated adjacent side portions 26 of neighbouring pairs of loops are urged, by cushion pressure, together to form a substantial cushion seal. The arrangement allows the loops 10 to deflect relative to each other when contacted by the surface 2 so that, when deflection does occur, very little air escapes from the cushion 3. As best shown in FIGURE 3, the bottom edges of the loops 10 are substantially at right angles to the outer portions 25 thereof. This arrangement transfers tension loads in the loops 10 along straight lines to the hard structure of the vehicle body and maintains the side portions of the loops in tension, thus allowing the use of thin, light material for their construction.

With reference now to FIGURES 5 and 6, the sides of the cushion 3 are contained by the side wall parts 8 and each of these wall parts is of the form disclosed in copending application Ser. No. 528,328, that is, they comprise upper and lower wall members 30, 31 of flexible sheet material, both of which are open to the cushion 3 and therefore inflated thereby. The wall members 30, 31 are inflated to conform to the shapes illustrated. The single, upper wall member 30 is attached to the hull 4 and the lower wall members 31 (they are a plurality) are connected to the upper wall member so as to deflect therewith, whereby (as explained in said copending application Ser. No. 528,238) components of the tensile loading forces applied to each wall member by cushion pressure oppose one another so as to place the wall part 8 in an equilibrium position wherein the bottoms of the wall members 31 are maintained in light contact with the surface 2 over a wide range of operating conditions.

The bottom wall members 31 are also of the type disclosed by copending application, Ser. No. 566,948 mentioned above in respect of the loops 10 of FIGURES 3 and 4, and thus can readily deflect relative to each other in order, for example, to accommodate the undulating profile of a wave.

The wall parts 8 are attached to sloping side surfaces 32 of the hull 4. The upper edges 33 of the wall members 30 are attached directly to the upper edges of the surfaces 32 and the inner corners 34 of the side parts 35 of the wall members are attached to the lower edges of the surfaces 33 by tie-cords 36. For control purposes, the effective lengths of the tie-cords 36 are varied by hydraulic actuators 37 disposed within the hull 4 and under the control of the vehicle pilot through hydraulic signal lines 38, for example, so that the centre of pressure of the cushion 3 is moved sideways with respect to a vertical axis 39 extending through the centre of gravity of the vehicle 1.

With reference to FIGURES 7 to 9, the upper rear of the cushion 3 is contained by the rear wall part 9 but the bottom of the rear wall 9 terminates short of the surface 2 to allow cushion air to escape rearwardly (as indicated by the arrow 40 of FIGURE 7) for the purpose explained hereinafter. The wall part 9 is attached to a sloping stern surface 48.

The rear wall part 9 is similar in construction to the side wall parts 8 of FIGURES 5 and 6, that is, it has upper and lower wall members 41, 42 of form generally similar to the wall members 30, 31 of FIGURE 5 but, instead of being open directly to the cushion 3, the wall members 41, 42 are sealed off from direct communication with the cushion space by panels 43 and 44 of flexible material. The wall part 9 has open ends which "blend" with the side wall parts 8 so that cushion air enters the wall part 9 indirectly by way of the wall members 30 of the side wall parts 8, as indicated by the arrows 45 of FIGURE 2. The panels 43, 44 impede the entry of water and other foreign matter into the wall part 9 which would impose undue drag loads on said wall part. Some water does, inevitably, enter the interior of the wall part 9, either by leakage or in the form of spray picked up by the cushion air inflating the wall part, and this is allowed to escape by way of small-bore drain holes 46 (FIGURE 9) formed in the bottom of each wall member 42. Direct entry of water into the drain holes 46 is prevented by strips 47 of flexible material each of which has one end attached to the wall members 42 so that the opposite ends are deflected by air and, when present, water escaping through the drain holes 46.

In operation, as the vehicle 1 is propelled over the surface 2, pressurised air passes from the interior of the hull 4 downwardly through the foremost loops 10 to maintain the cushion 3. Those loops 10 which are not supplied with air from the fan 16 (i.e., those outside the area A of FIGURE 2) are inflated by air forming the cushion 3. As explained hereinabove, air forming the cushion 3 also inflates the side and rear wall parts 8, 9.

Should the vehicle 1 encounter rough seas, the foremost of the loops 10 will be struck head on by waves and impact on these loops is resisted by a buildup in the pressure of the air flowing down through the loops. The loops 10, by reason of their method of attachment and by reason of their taper, can only deflect inwardly at local points and not upwardly or downwardly so that the wave impacts do not result in the application of unacceptable drag loads on the vehicle 1.

It is conceivable that, should the vehicle 1 tend to assume a prow-down attitude, the bottoms of the loops 10 will collapse and this will introduce drag loads but these will only be of a temporary nature as collapse of the loop bottoms brings about an immediate increase in the plan area of the cushion 3, which increase results in the application of an upwardly directed righting force on the prow surface 5 to restore the vehicle 1 to its original attitude.

By allowing a deliberate escape of cushion air from the cushion space, in this example, from the rear end of the cushion space where the escaping air applies a thrust assisting in the forward propulsion of the vehicle, the vehicle is provided with a satisfactory "ride" characteristic. If there were no deliberate leak of cushion air, in the event of the vehicle hull 4 and the surface being temporarily brought closer together as the vehicle travels over a rough sea, the subsequent rise in cushion pressure would result in the immediate application of an upward force on the hull 4. This rise and fall of the vehicle can produce an unpleasant "ride," particularly at high speed, but by providing for a ready escape of cushion air and by providing a continuous supply of air to the cushion any tendency of the vehicle to rise and fall is "smoothed out." The arrangement also avoids subjecting the fan 16 to sudden changes of load.

As the vehicle 1 traverses waves on the surface 2 cushion air is impeded from escaping through the temporary gap defined by the bottom of the loops 10 and the trough of a wave by the air flowing down the loop interior which issues from the bottom edges of the loops to form a cushion-containing curtain, in the well-known manner.

Providing the vehicle body 5 with sloping surfaces ensures that, in the event of loss of the cushion 3, the vehicle body is provided with hydrodynamic lift.

Attaching the wall parts 7, 8, 9 to the sloping surfaces of the vehicle body 5 allows easy access to the attachment points, even when, in the absence of the cushion 3, the vehicle body 5 is at rest on a ground surface.

In a (non-illustrated) modification, the sloping surface 48 of FIGURE 7 is apertured so that a small percentage (e.g., 15%) of air is allowed to enter the interior of the wall part 9 directly from the interior of the hull 4, in addition to that entering from the cushion space, so as to inflate the wall part 9 to slightly above cushion pressure whereby it is slightly "stiffer" when deflected.

In the modification illustrated in FIGURE 10, the loops 10 are formed by folding a continuous strip 55 of flexible material. Attachment of the loops 10 to the prow surface 5 is by clamping strips 56 screwed to said surface.

With reference now to FIGURE 11, in the modification shown therein which uses loops 10 formed from separate pieces of flexible material, the sloping under surface 5 of the vehicle 1 is discontinuous or "stepped," the top edges 58 of the side portions 17 of the loops are scalloped and the loops 10 are attached to the fore and aft margins only of the surface 5 along the fore-to-aft lines of attachment 11. The scalloped edges 58 and the concavity defined by the discontinuity in the surface 5 define an air space 59 which serves as air reservoir for the exchange of air from the interior of one loop 10 to another. This arrangement is advantageous in the event of a loop 10 collapsing as the air forced out of the collapsed loop can pass readily into a neighbouring loop. The arrangement allows a single port 18 to supply air to a plurality (say three or four) loops.

The modification of FIGURE 11 also ensures that the air ports 18 are maintained clear of loop material when a loop collapses so that, in this event, the supply of air from the port remains unobstructed.

If the inflation loads applied to the loops 10 of FIGURE 11 require the loops to be given additional support, ties 60 can be provided which extend between midway points on the top edges 58 and adjacent points on the discontinuous surface 5.

Under certain conditions of over-water operation, it is conceivable that water could be forced between the adjacent side portions 17 of neighbouring loops 10 to find its way into the interiors of the loops by way of the air space 59. To prevent this neighbouring loops can be sewn together along their adjacent upper edges 58 only.

In the modification illustrated in FIGURE 12 of any of the above-described arrangements, the air supply apertures or ports 18 form a plurality of groups each of which is fed by its own fan 16. Each fan is driven by a variable speed motor 17 (not shown) so that the speeds of the fans 16 are adjustable whereby air is supplied in a controlled manner to the groups of ports 18 at differing pressures. A series of pressure-sensitive probes 65 are distributed, within the cushion space, around peripheral parts of the hull 4 and connected to fan speed controllers 66. The probes 65 sense changes in attitude of the vehicle relative to the surface beneath by detecting local changes in cushion pressure caused by variation in attitude of the vehicle body. The pressure changes are signalled to the controllers 66 so that more or less cushion air finds its way to particular parts of the cushion 3 whereby a righting force is applied to the vehicle body which tends to correct a change in attitude thereof. Alternatively, the controllers 66 could be adapted to control the actuators 37 (FIGURE 5) and/or similar actuators adapted to vary the effective heights of local portions of the wall parts 7, 8, 9 for vehicle manoeuvring purposes.

In a further modification of the arrangement of FIGURE 12, the probes 65 are connected to high pressure air supply sources (e.g. tappings from an air compressor) and adapted so that the probes discharge jets of pressurised air downwardly on to the surface 2 and from positions adjacent said surface. As the attitude of the vehicle varies, so the back pressures in the probes 65 will change and the controllers 66 can be made to sense the back pressure differentials between, for example, a port and a starboard-disposed probe.

I claim:

1. A gas-cushion vehicle provided with a hull structure which, in operation, is supported above a surface, at least in part, by a cushion of pressurized gas formed and contained in a space beneath the vehicle, said hull structure having a prow portion with an under surface which slopes upwardly from the bottom region of said hull structure, and a flexible wall for containing said cushion carried by said prow portion, said wall comprising a plurality of juxtaposed loops of flexible sheet material depending from said sloping under surface and deflectable relative to each other, each of said loops having a concave portion with the hollow of its concavity facing and open to the cushion and including a pair of side portions extending inwardly from the concavity towards the cushion, each side portion of said loops being directly attached to said sloping under surface along lines of attachment extending between adjacent loops substantially in the fore and aft direction of said sloping under surface, said loops each having a deep fold at its lower end, reaching below the lowest part of said hull structure to a distance slightly less than the desired depth of the gas cushion beneath said hull, the loops tapering upwardly and continuously towards a minimum depth of fold at the upper ends thereof, and means for delivering pressurized gas to the interior of at least the foremost of the loops for discharge in a generally downward direction therebelow to at least assist in the formation and maintenance of said gas cushion.

2. A vehicle as claimed in claim 1 wherein the depth of fold of at least one loop at the lower end thereof is not less than four times the distance between oppositely facing side portions of the loop.

3. A vehicle as claimed in claim 1 wherein said juxtaposed loops are formed by folding a continuous strip of flexible material.

4. A vehicle as claimed in claim 1 wherein at least two of the loops are formed from separate pieces of flexible material.

5. A vehicle as claimed in claim 1 wherein the sloping surface has a discontinuity.

6. A vehicle as claimed in claim 1 provided with a plurality of gas supply means for supplying pressurised gas to the interiors of at least some of the loops in a controlled manner, with each gas supply means serving a group of loops and each being under the control of one of a plurality of sensing means distributed about the vehicle and sensitive to changes in attitude of the vehicle body relative to the surface beneath so as to vary the supply of pressurised gas to the groups of loops whereby a righting force is applied to the vehicle body which tends to correct changes in attitudes thereof.

7. A vehicle as claimed in claim 6 wherein each sensing means comprises a pressure-sensing probe disposed in the cushion space so as to be sensitive to changes in cushion pressure.

8. A vehicle as claimed in claim 6 wherein each sensing means comprises a probe including means for discharging a jet of pressurised fluid downwardly on to the surface beneath the vehicle whereby a change in attitude of the vehicle is sensed as a change in fluid back-pressure by the probe.

References Cited

UNITED STATES PATENTS

| 3,211,246 | 10/1965 | Lewis | 180—127 |
| 3,291,240 | 12/1966 | Driver | 180—128 |
| 3,321,039 | 5/1967 | Watts | 180—127 |

FOREIGN PATENTS 938,826  10/1963  Great Britain.

A. HARRY LEVY, *Primary Examiner.*

U.S. Cl. X.R.

180—128